United States Patent
Byun et al.

(10) Patent No.: US 9,558,883 B2
(45) Date of Patent: Jan. 31, 2017

(54) POWER TRANSMITTER AND METHOD FOR CONTROLLING POWER TRANSMISSION

(71) Applicant: Samsung Electronics Co., Ltd., Gyeonggi-do (KR)

(72) Inventors: Kang-Ho Byun, Gyeonggi-do (KR); Kyung-Woo Lee, Seoul (KR); Yu-Su Kim, Suwon-si (KR); Se-Ho Park, Gyeonggi-do (KR); Sung-Ku Yeo, Gyeonggi-do (KR); Young-Min Lee, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 777 days.

(21) Appl. No.: 13/875,847

(22) Filed: May 2, 2013

(65) Prior Publication Data

US 2013/0293028 A1    Nov. 7, 2013

(30) Foreign Application Priority Data

May 2, 2012    (KR) .................. 10-2012-0046524

(51) Int. Cl.
*H01F 38/14* (2006.01)
*H02J 7/02* (2016.01)
*H02J 7/00* (2006.01)

(52) U.S. Cl.
CPC .............. *H01F 38/14* (2013.01); *H02J 7/025* (2013.01); *H02J 2007/0096* (2013.01)

(58) Field of Classification Search
CPC .... H01F 38/14; H02J 7/025; H02J 2007/0096; H02J 2007/0098

USPC ......................................................... 307/104
See application file for complete search history.

(56) References Cited

U.S. PATENT DOCUMENTS

| 8,090,550 | B2* | 1/2012 | Azancot | H02J 5/005 235/380 |
| 8,446,046 | B2* | 5/2013 | Fells | H02J 5/005 307/104 |
| 2008/0094027 | A1* | 4/2008 | Cho | H02J 7/00 320/108 |
| 2009/0001932 | A1* | 1/2009 | Kamijo | H02J 5/005 320/108 |
| 2009/0015210 | A1* | 1/2009 | Kojima | B60L 3/04 320/163 |

(Continued)

*Primary Examiner* — Jared Fureman
*Assistant Examiner* — Michael Warmflash
(74) *Attorney, Agent, or Firm* — The Farrell Law Firm, P.C.

(57) ABSTRACT

Methods and apparatus are provided for detecting a non-intended object of power reception by a power transmitter. Power transmission for communication is performed, when the load change is sensed that has a value greater than or equal to a predetermined threshold. It is determined whether a subscription request, for subscribing to a network is received within a predetermined time period. The power transmission for communication is stopped when the subscription request is not received within the predetermined time period. Power is transmitted to a power receiver that has transmitted the subscription request, when the subscription request is received within the predetermined time period. It is determined whether a leakage power value exceeds an allowable range, when the power state report is received from the power receiver. The transmission of the power to the power receiver is stopped, when the leakage power value exceeds the allowable range.

17 Claims, 7 Drawing Sheets

(56) References Cited

U.S. PATENT DOCUMENTS

| | | | |
|---|---|---|---|
| 2009/0133942 A1* | 5/2009 | Iisaka | H02J 7/025 178/43 |
| 2009/0206791 A1* | 8/2009 | Jung | H02J 7/025 320/108 |
| 2010/0084918 A1* | 4/2010 | Fells | H02J 5/005 307/32 |
| 2010/0201315 A1* | 8/2010 | Oshimi | H02J 7/025 320/108 |
| 2010/0253281 A1* | 10/2010 | Li | H02J 7/0027 320/108 |
| 2011/0050164 A1* | 3/2011 | Partovi | H01F 5/003 320/108 |
| 2011/0270462 A1* | 11/2011 | Amano | H02J 5/005 700/297 |
| 2012/0038223 A1* | 2/2012 | Harakawa | H01F 38/14 307/109 |
| 2012/0306284 A1* | 12/2012 | Lee | H02J 17/00 307/104 |
| 2013/0154557 A1* | 6/2013 | Lee | H04B 5/0037 320/108 |
| 2014/0159501 A1* | 6/2014 | Kanno | H02J 17/00 307/104 |

\* cited by examiner

POWER TRANSMITTER AND METHOD FOR CONTROLLING POWER TRANSMISSION

PRIORITY

This application claims priority under 35 U.S.C. §119(a) to Korean Patent Application Serial No. 10-2012-0046524, which was filed in the Korean Intellectual Property Office on May 2, 2012, the contents of which are incorporated herein by reference.

BACKGROUND OF THE INVENTION

1. Field of the Invention

The present invention relates generally to a wireless charging technology, and more particularly, to a power transmitter and a method for detecting a non-intended object of power reception in a technology for wirelessly transmitting and receiving power, which employs a resonance scheme.

2. Description of the Related Art

A system for wirelessly transmitting power includes a power transmitter and a power receiver. Power is transmitted between a primary coil of the power transmitter and a secondary coil of the power receiver.

There are two types of communication schemes that may be used in the system for wirelessly transmitting power, which has the structure as described above.

The communication schemes include an in-band scheme for performing communication through coils delivering power, and an out-band scheme for performing communication through a communication side separate from the coils delivering the power.

Figure 1:
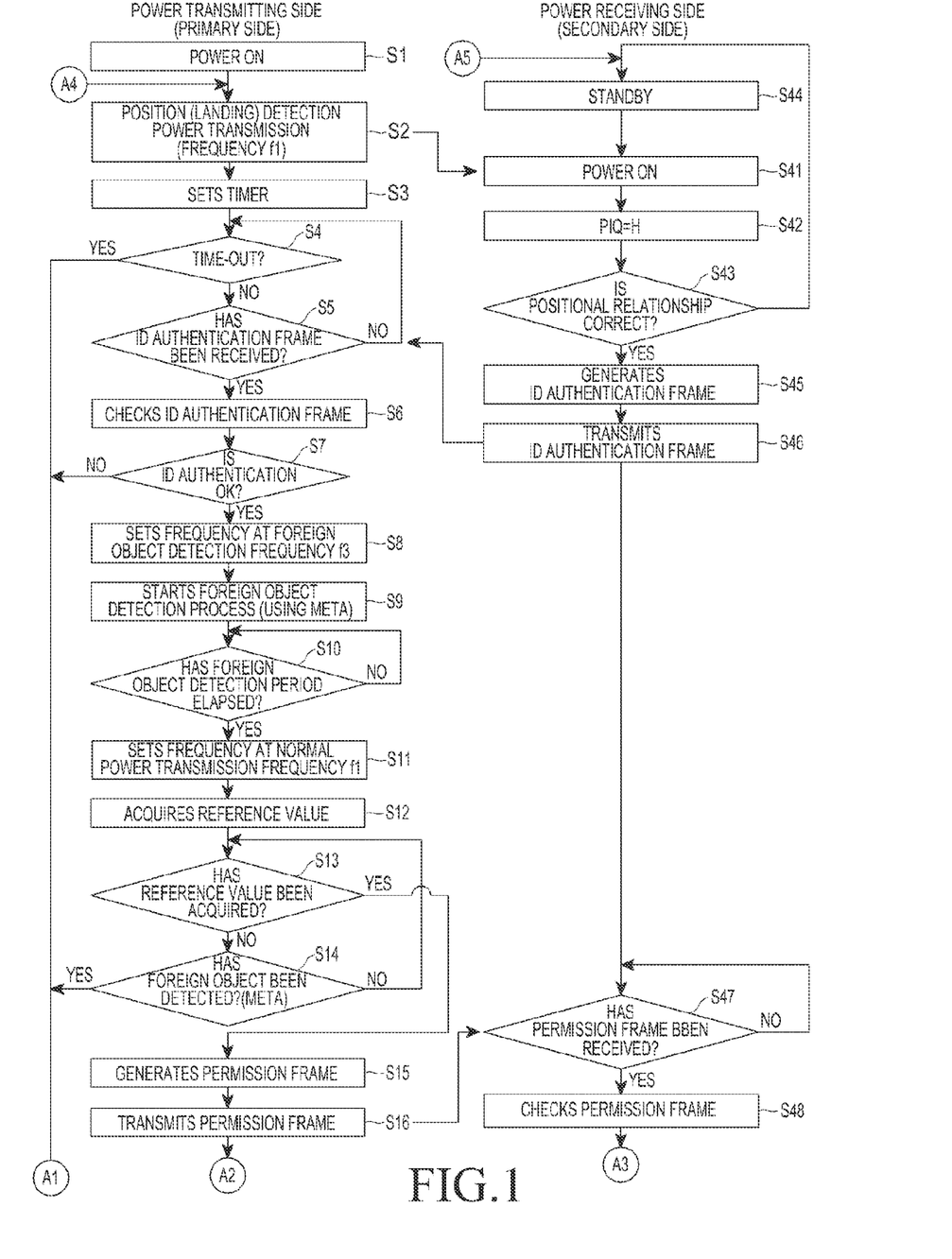
FIG. 1 and FIG. 2 are a flowchart showing an operation process of a conventional system for wirelessly transmitting power.
Figure 2:
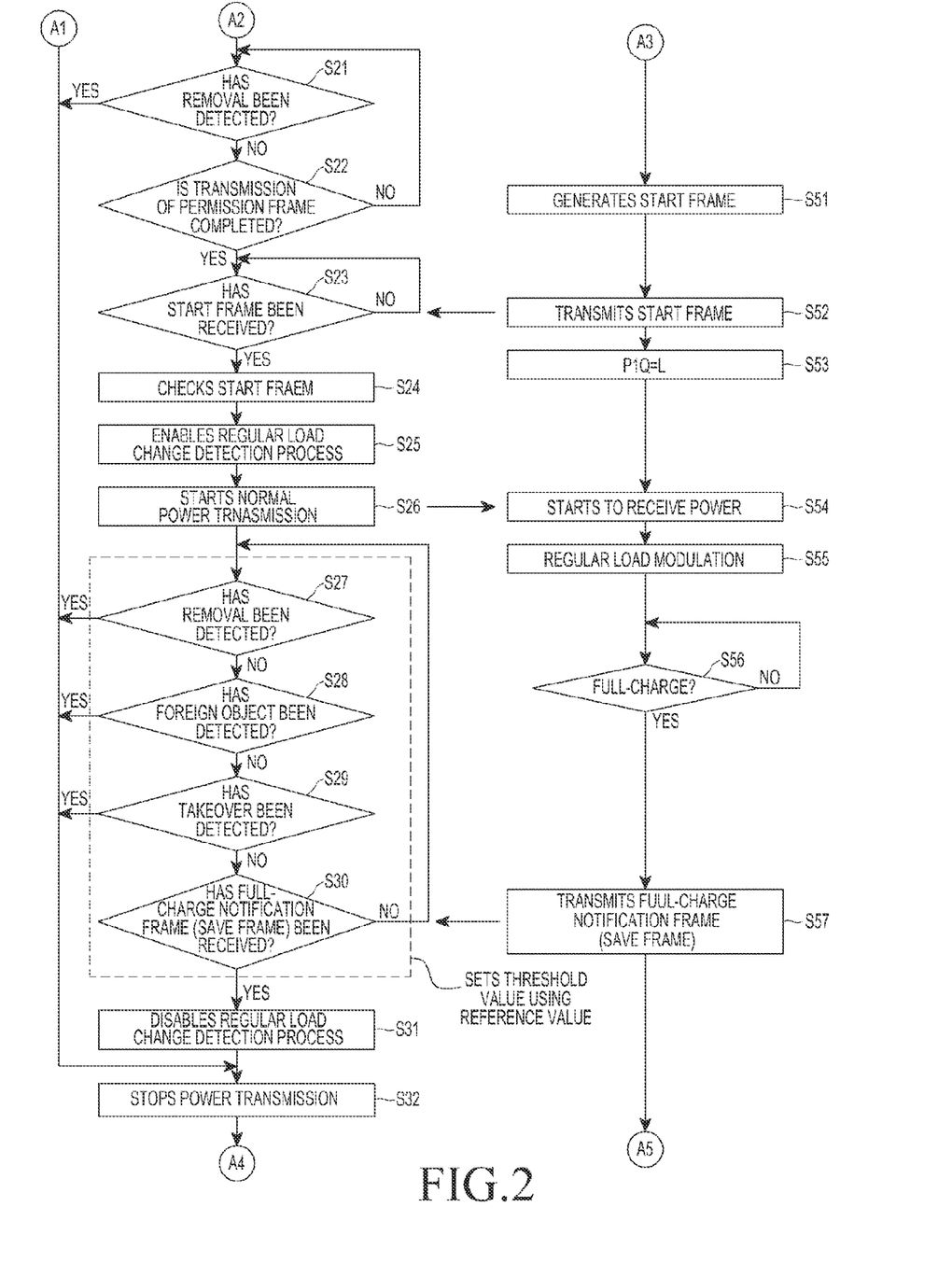

A system for wirelessly transmitting power, which employs an in-band scheme, operates as shown in FIG. 1 and FIG. 2. As shown in FIG. 1 and FIG. 2, a power receiver transmits data by using load modulation, and a power transmitter transmits data by using frequency modulation. In this in-band scheme, power is wirelessly transmitted and communication is performed simultaneously.

In order to sense invalid materials, after authenticating an Identifier (ID), the power transmitter transmits a signal at a particular frequency, and observes a width of a pulse wave. An observed value is compared with a reference value, and material validity is determined based on a result of the comparison.

Before the transmission of power, the power transmitter measures a width of the pulse wave, and acquires a reference value. When power is transmitted, the acquired reference value is used as a reference to determine whether invalid materials have entered.

As described above, when the power transmitter fails to receive an ID authentication frame from the materials sensed when authenticating an ID, it performs a control operation so as to stop the transmission of power to the sensed materials. However, it is difficult to determine that failing to receive the ID authentication frame by the power transmitter is regarded as sensing the invalid receiver or the invalid materials. Also, the measured value is used as the reference value. Accordingly, when the power receiver and the invalid materials are simultaneously placed on a charging deck, it is difficult to detect a non-intended object of power reception.

Moreover, a method for controlling power transmission, which is appropriate in an environment for wirelessly transmitting power to a single object, is described. However, no consideration is given to a method for sensing a non-intended object of power reception in an environment for wirelessly transmitting power to multiple objects.

In the case of an abnormal condition, for example, when invalid materials such as an invalid power receiver and invalid metallic materials are located within a charging area, in the environment for wirelessly transmitting power as described above, there may occur unintended events, such as, for example, failure and overheating, which are caused by power loss/overload.

SUMMARY OF THE INVENTION

The present invention has been made to address at least the above problems and/or disadvantages and to provide at least the advantages described below. Accordingly, an aspect of the present invention provides a power transmitter and a method for efficiently detecting a non-intended object of power reception in a system for wirelessly transmitting power.

Another aspect of the present invention provides a power transmitter and a method for detecting a non-intended object of power reception in order to ensure the efficiency of power transmission in an environment for wirelessly transmitting power to multiple objects.

In accordance with an aspect of the present invention, a method is provided for detecting a non-intended object of power reception by a power transmitter. It is determined whether a load change is sensed that has a value greater than or equal to a predetermined threshold. Power transmission for communication is performed, when the load change is sensed. It is determined whether a subscription request, for subscribing to a network for wirelessly transmitting power, is received within a predetermined time period in response to the power transmission. The power transmission for communication is stopped when the subscription request is not received within the predetermined time period. Power is transmitted to a power receiver that has transmitted the subscription request, when the subscription request is received within the predetermined time period. It is determined whether a power state report is received from the power receiver in response to the power transmission. It is determined whether a leakage power value exceeds an allowable range, by using information included in the power state report, when the power state report is received from the power receiver. The transmission of the power to the power receiver is stopped, when the leakage power value exceeds the allowable range.

In accordance with another aspect of the present invention, a power transmitter is provided for detecting a non-intended object of power reception. The power transmitter includes a communication unit for performing wireless communication, and a power supply unit for supplying power so as to generate a resonance frequency signal determined by a controller. The power transmitter also includes a voltage/current measurement unit for measuring a voltage and a current of a signal generated by the power supply unit, and a resonance signal generator for transmitting the power delivered by the power supply unit to one or more power receivers. The power transmitter further includes the controller for determining whether the voltage/current measurement unit senses a load change that has a value greater than or equal to a predetermined threshold, controlling the resonance signal generator to perform power transmission for communication when the voltage/current measurement unit senses the load change, determining whether a subscription request, for subscribing to a network for wirelessly transmitting power, is received within a predetermined time period in response to the power transmission, stopping the power transmission for communication when the subscription request is not received within the predetermined time period, performing a control operation so as to transmit power to the power receiver that has transmitted the subscription request when the subscription request is received within the predetermined time period, determining whether a power state report is received form the power receiver in response to the power transmission, determining whether a leakage power value exceeds an allowable range by using information included in the power state report when the power state report is received from the power receiver, and performing a control operation so as to stop the transmission of the power to the power receiver when the leakage power value exceeds the allowable range.

BRIEF DESCRIPTION OF THE DRAWINGS

The above and other aspects, features, and advantages of the present invention will be more apparent from the following detailed description when taken in conjunction with the accompanying drawings, in which.

DETAILED DESCRIPTION OF EMBODIMENTS OF THE PRESENT INVENTION

Embodiments of the present invention are described in detail with reference to the accompanying drawings. The same or similar components may be designated by the same or similar reference numerals although they are illustrated in different drawings. Detailed descriptions of constructions or processes known in the art may be omitted to avoid obscuring obscure the subject matter of the present invention.

Embodiments of the present invention provide a method for detecting a non-intended object of power reception in a system for wirelessly transmitting power to multiple objects. A power transmitter determines whether an authentication request message is received in response to power transmission for communication, when the power transmitter senses a load change. The power transmitter determines whether the load change is within a predetermined range, based on initial information of a power receiver included in the authentication request message, when the authentication request message is received. The power transmitter determines the power receiver as a non-intended object of power reception when the load change exceeds the predetermined range. Therefore, even when the power receiver and invalid materials are simultaneously located within an effective charging area, the invalid materials can be detected.

Before describing embodiments of the present invention, the term "invalid materials" is defined as follows. The invalid materials are other materials that are receiving power transmitted by the power transmitter, except for an intended power receiver, when the power transmitter transmits power. The invalid materials may include metallic materials, an electronic device with which the power transmitter fails to communicate, and a power receiver with which the power transmitter does not intend to communicate. In the following description, these invalid materials are collectively referred to as "non-intended objects of power reception."

Hereinafter, the configuration of a system for wirelessly transmitting power, according to an embodiment of the present invention, is described with reference to FIG. 3.

Figure 3:
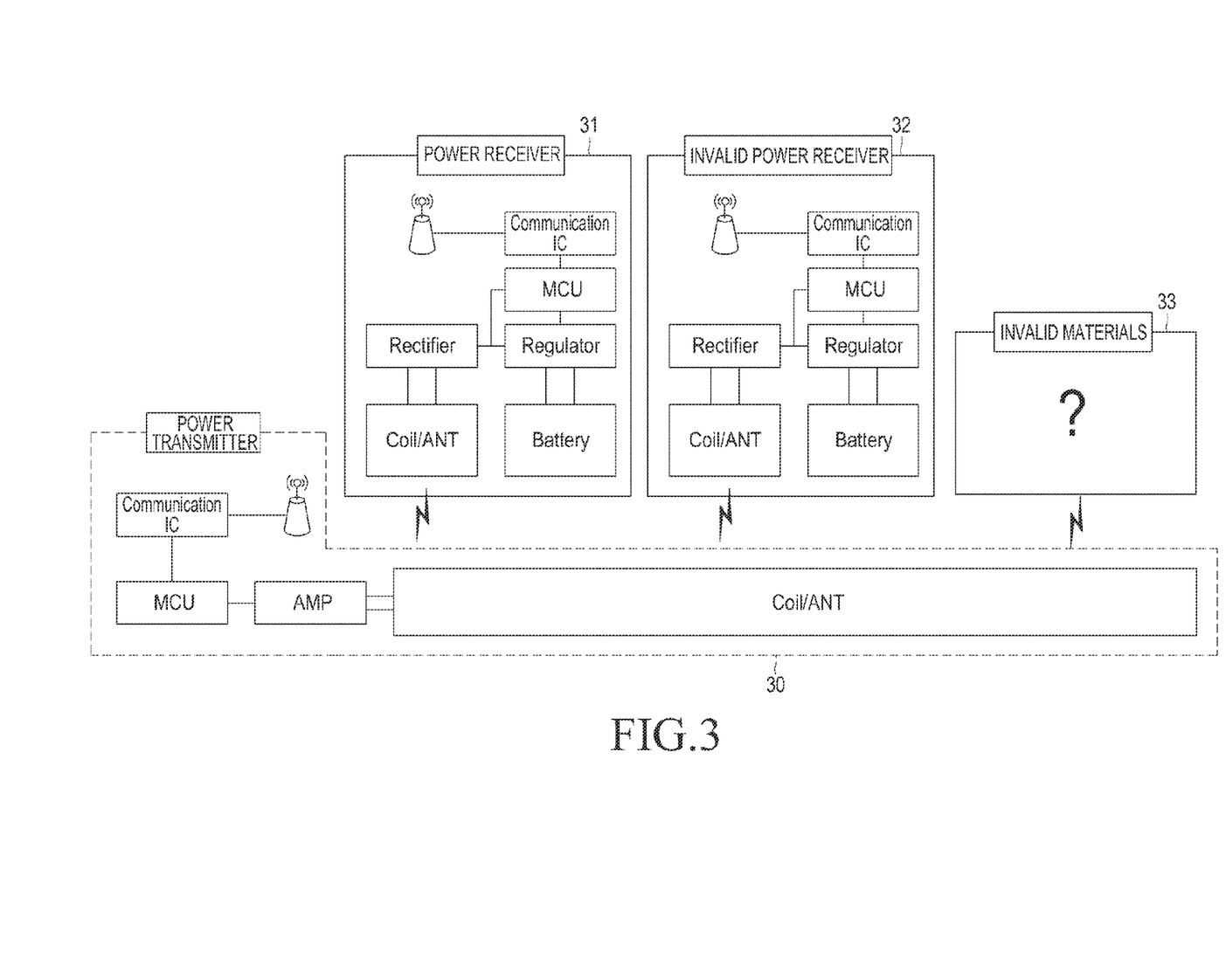
FIG. 3 is a block diagram illustrating a configuration of a system for wirelessly transmitting power to multiple objects, according to an embodiment of the present invention.

Referring to FIG. 3, a power transmitter 30 may sense that an object of power reception is placed on a charging deck, by using a load detection function, and may wirelessly transmit power to one or more power receivers. The power transmitter 30 communicates with a power receiver 31 according to a communication system that is separate from wireless power transmission.

When the power receiver 31 is located within an effective range, namely, an effective charging area, of a primary coil of the power transmitter 30, the value of a voltage (or current) measured at the primary coil of the power transmitter 30 changes. Specifically, the value of a voltage, which is measured for a load change, changes. However, the same phenomenon may occur when an invalid power receiver 32 or invalid materials 33 are located within the effective range of the primary coil of the power transmitter 30. Also, a load change may occur even when the invalid power receiver 32 or the invalid materials 33, are simultaneously located within the effective charging area with the power receiver 31.

The transmission of power to a non-intended object of power reception may reduce the efficiency of power transmission, and may cause an accident resulting from failure and overheating due to overload. Accordingly, there is a need to ensure safety of the system for wirelessly transmitting power by detecting a non-intended object of power reception and stopping the transmission of power to the non-intended object of power reception.

As described above, embodiments of the present invention provide a system for wirelessly transmitting power, which includes the power transmitter capable of wirelessly transmitting power to the multiple power receivers, and the power receivers capable of wirelessly receiving the power. According to embodiments of the present invention, when one or more charging objects are located within the effective charging area, it is possible to detect a non-intended object of power reception, which is not valid among the charging objects.

Figure 4:
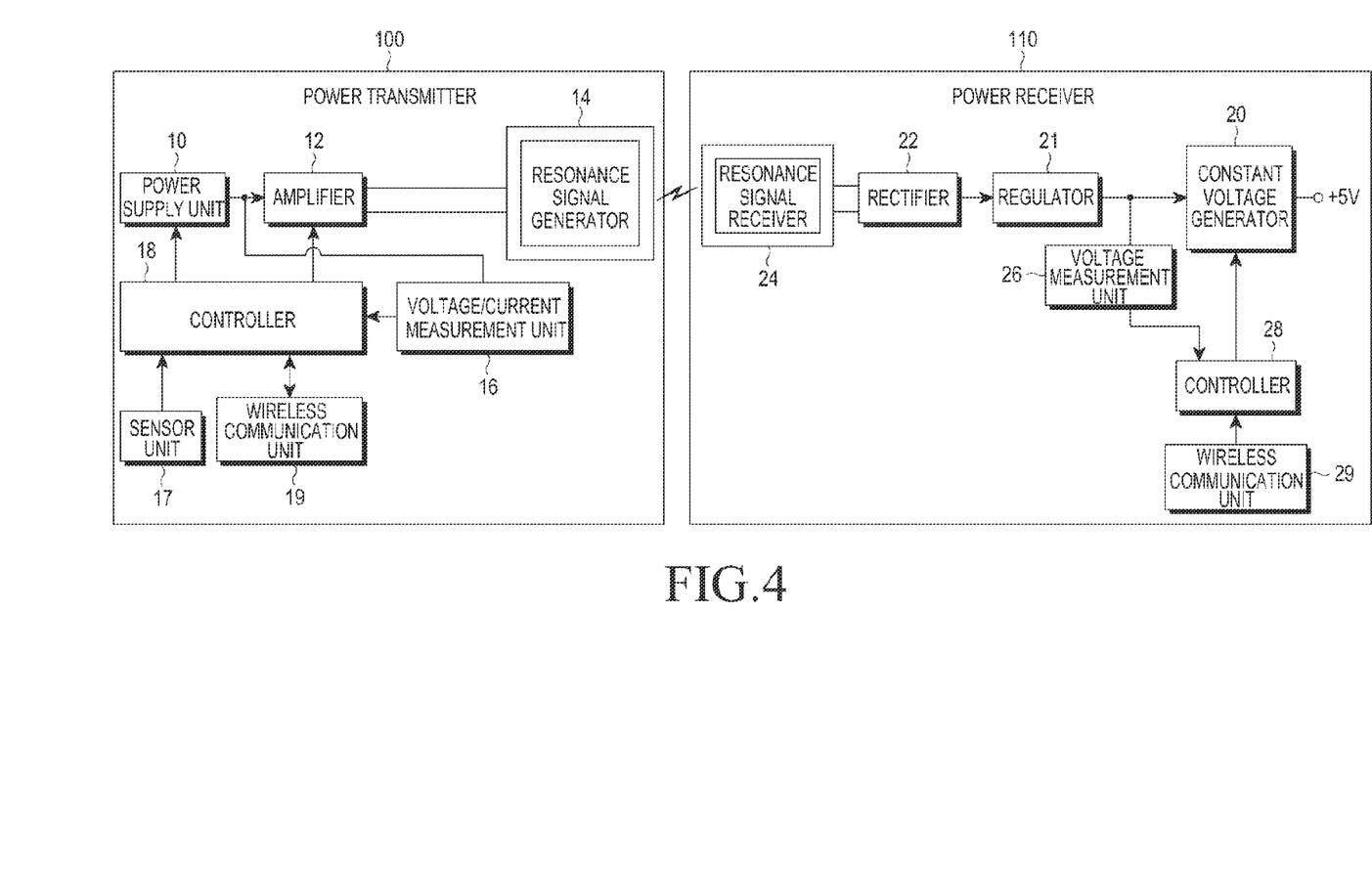
FIG. 4 is a block diagram illustrating detailed internal configurations of a power transmitter and a power receiver in a system for wirelessly transmitting power to multiple objects, according to an embodiment of the present invention.

A method for detecting such a non-intended object of power reception is described in detail with reference to FIG. 4. FIG. 4 is a block diagram illustrating internal configurations of a power transmitter and a power receiver included in a system for wirelessly transmitting power, according to an embodiment of the present invention.

Referring to FIG. 4, the power transmitter 100 includes a power supply unit 10, which includes a Voltage Controlled Oscillator (VCO) and the like, and supplies power so as to generate a resonance frequency signal determined by a controller 18. The power transmitter 100 also includes an amplifier 12 for amplifying a signal generated by the power supply unit 10 to a high-power signal, according to power supplied by the power supply unit 10. The power transmitter 100 additionally includes a resonance signal generator 14 for transmitting power from the power supply unit 10 to one or more power receivers through a wireless resonance signal, according to the high-power signal generated by the amplifier 12. The power transmitter 100 further includes a voltage/current measurement unit 16 for measuring a voltage and a current of a signal generated by the power supply unit 10. The power transmitter 100 also includes a controller 18 for comprehensively controlling an operation of the power transmitter 100 for wirelessly transmitting power. Particularly, the controller 18 monitors a current and a voltage of a resonance signal wirelessly transmitted according to the current and the voltage measured by the voltage/current measurement unit 16, and controls operations of the power supply unit 10 and the amplifier 12 so that each of the current and the voltage of the resonance signal maintains a value previously set to have a normal range. The power transmitter 100 further includes a wireless communication unit 19 configured by applying one scheme selected from among various wireless short-range communication schemes, such as, for example, Bluetooth, in order to communicate with the power receiver 110 in relation to the operation of wirelessly transmitting power under the control of the controller 18. The resonance signal generator 14 includes a charging board, upon which a power receiver may be placed, at an upper part thereof.

In addition, the power transmitter 100 includes a sensor unit 17 that includes an object detection sensor and the like, in order to sense that the power receiver 110 is placed and to provide a sensing signal to the controller 18. The controller 18 of the power transmitter 100 may include a Micro Controller Unit (MCU) and the like, and the operation of detecting a non-intended object of power reception, according to an embodiment of the present invention, is described in greater detail below with reference to FIG. 5 and FIG. 6.

The power receiver 110 includes a resonance signal receiver 24 for receiving a wireless resonance signal transmitted by the resonance signal generator 14 of the power transmitter 100. The power receiver 110 also includes a rectifier 22 for rectifying power in the form of an Alternating Current (AC) received by the resonance signal receiver 24 into power in the form of a Direct Current (DC). The power receiver 110 additionally includes a regulator 21 for smoothing DC power rectified by the rectifier 22. The power receiver 110 further includes a constant voltage generator 20 for converting power, which is output from the regulator 21, to an operating power (for example, +5V) desired by a portable terminal or the like, to which the relevant power receiver is applied. The power receiver 110 also includes a voltage measurement unit 26 for measuring an input voltage of the constant voltage generator 20. The power receiver 110 further includes a controller 28 for comprehensively controlling an operation of the power receiver 110 for wirelessly receiving power, determining a power reception state according to a detection signal of the voltage measurement unit 26, and providing information on the power reception state. The controller 18 of the power receiver 110 may also include an MCU.

In addition, the power receiver 110 includes a wireless communication unit 29 configured by applying one scheme selected from among various wireless short-range communication schemes, in order to communicate with the power transmitter 100 in relation to the operation of wirelessly receiving power under the control of the controller 28. Under the control of the controller 28, the wireless communication unit 29 may transmit and receive various pieces of information and various messages, which are necessary in a wireless charging process, through short-range wireless communication.

Figure 5:
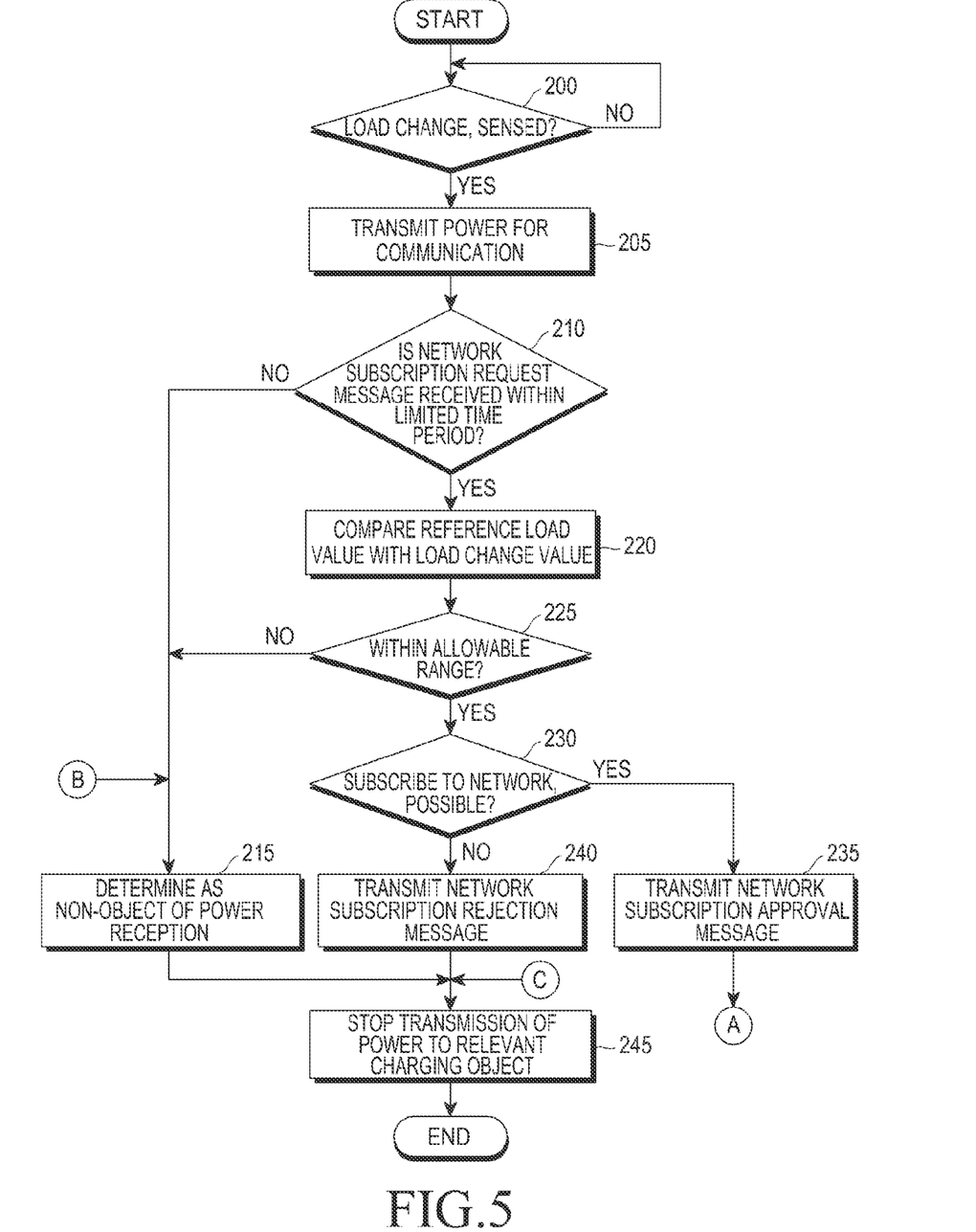
FIG. 5 and FIG. 6 are a flowchart illustrating a process for detecting a non-intended object of power reception by a power transmitter, according to an embodiment of the present invention.
Figure 6:
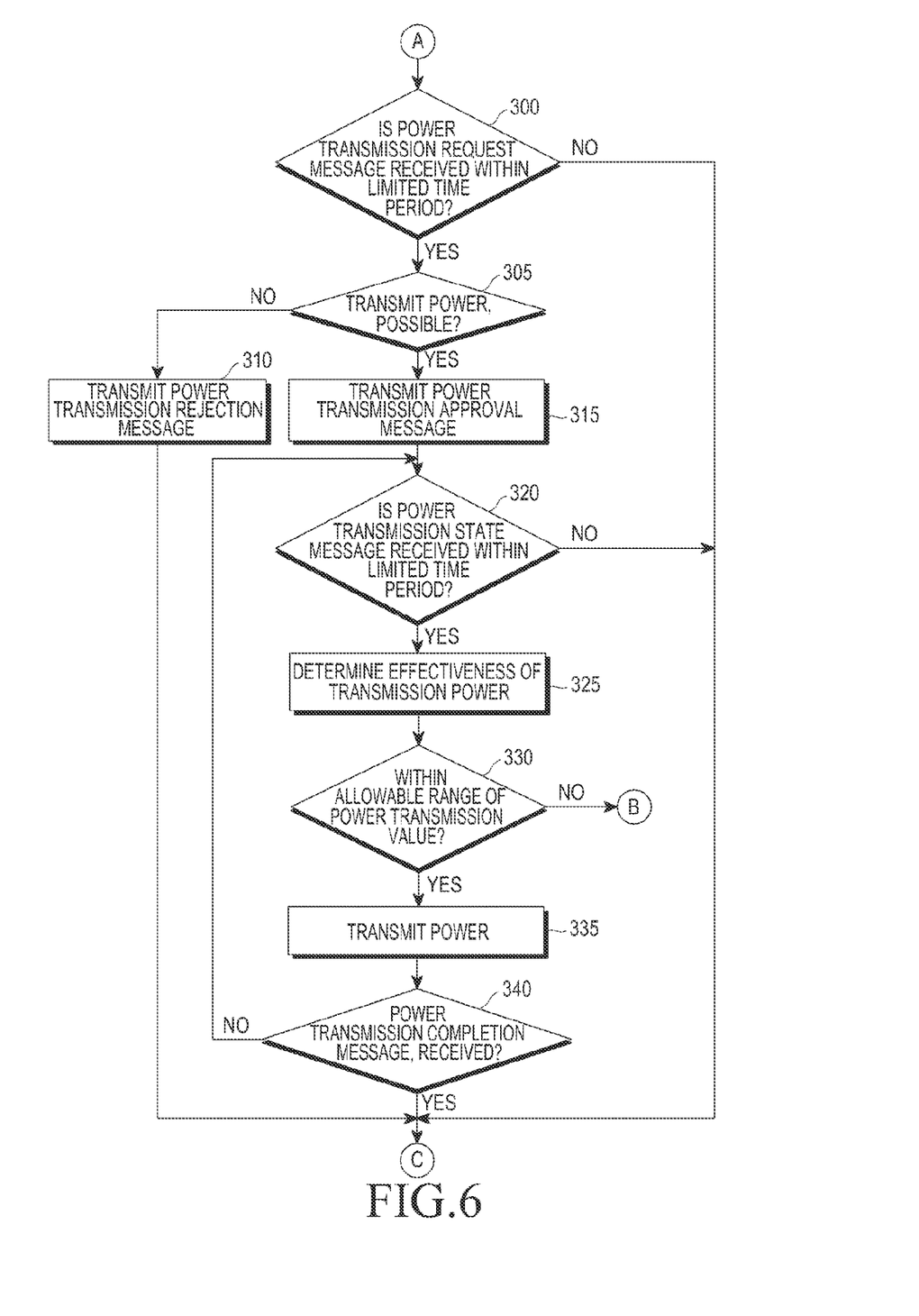

FIG. 5 and FIG. 6 are a flowchart illustrating an operation of a power transmitter 100 for detecting a non-intended object of power reception, according to an embodiment of the present invention. FIG. 6 is a view following FIG. 5. Herein, reference numeral A is used to represent that step 235 of FIG. 5 is connected to step 300 of FIG. 6, reference numeral B is used to represent that step 330 of FIG. 6 is connected to step 215 of FIG. 5, and reference numeral C is used to represent that step 340 of FIG. 6 is connected to step 245 of FIG. 5.

Referring to FIG. 5, in step 200, the power transmitter 100 determines whether a load change is sensed that has a value greater than or equal to a predetermined threshold. The load change is sensed when, for example, the value of a voltage or current measured at the primary coil of the power transmitter 100 changes if the power receiver 110 is located within the effective range of the primary coil of the power transmitter 100. A voltage value or a current value is measured by the voltage/current measurement unit 16 of the power transmitter 100, and the controller 18 calculates a load change value by using the measured voltage value or current value. Specifically, the controller 18 calculates a load change value by comparing a presently-measured load value with a previously-measured load value. When a difference between the presently-measured load value and the previously-measured load value is greater than or equal to a predetermined threshold, a load change has occurred. When the previously-measured load value does not exist, the controller 18 calculates a load change value by comparing the measured load value with an initial load value, and compares the calculated load change value with the predetermined threshold. When the load change value is greater than or equal to the predetermined threshold, the calculated load change value is stored.

When no object is disposed within the effective charging area of the power transmitter 100 and a charging object enters the effective charging area or is disposed within it, a voltage value or a current value measured by a power transmitter 100 changes. Similarly, when the power transmitter 100 already transmits a certain amount of power to the charging object, and a new charging object is additionally disposed within the effective charging area, a load change is also sensed.

When an invalid electronic device or invalid metallic materials are disposed within the effective range, a load change having a value greater than or equal to a predetermined threshold may occur. Therefore, when a load change occurs, the power transmitter 100 needs to determine whether a charging object is a valid power receiver or it is a non-intended object of power reception, such as, for example an invalid electronic device or invalid metallic materials.

According to an embodiment of the present invention, in the following method, a determination is made as to whether a charging object is a non-intended object of power reception.

When the load change has a value greater than or equal to the predetermined threshold, the power transmitter 100 determines that an object that is to receive power is detected within the effective charging area, and transmits power for communication to the detected object that is to receive power, in step 205. The power transmitter 100 may first attempt to communicate with the object that is to receive power, namely, a charging object, in order to inquire of the charging object, whether it is a valid power receiver. Otherwise, the charging object may attempt to communicate with the power transmitter 100 in order to report that the charging object is a valid power receiver. FIG. 5 illustrates an embodiment in which the charging object first attempts communication in response to this power transmission.

Accordingly, the power receiver corresponding to the charging object that has received power, transmits a network subscription request message in order to subscribe to a network. Power is wirelessly transmitted to multiple objects, and a configuration including one or more power receivers and the power transmitter, for transmitting power to the power receivers, is defined as a network. Therefore, the network subscription request message includes initial information for reporting that the power receiver, corresponding to the charging object, is a valid power receiver. The initial information includes an ID of a power receiver, a protocol version, a reference load value in a power receiver, and a reference efficiency value in a power receiver.

In step 210, the power transmitter 100 determines whether the network subscription request message is received from the charging object, which has received the power, within a limited time period. The power transmitter 100 receives the network subscription request message through the wireless communication unit 19. Invalid materials such as, for example, metallic materials may change a voltage value or a current value measured by the power transmitter 100, but may not communicate with the power transmitter 100. Accordingly, the invalid materials may not respond to the transmission of power by the power transmitter 100. Specifically, the invalid materials may not report that they correspond to a valid power receiver.

Therefore, when the network subscription request message is not received, the power transmitter 100 fails to communicate with the charging object. Accordingly, the power transmitter 100 proceeds to step 215, and determines that the charging object causing the load change is a non-intended object of power reception. Specifically, the power transmitter 100 determines that the load change is caused by the invalid materials.

When the network subscription request message is received within the limited time period in step 210, the power transmitter 100 may distinguish the power receiver from other power receivers, based on an ID of the power receiver from among the initial information of the power receiver included in the network subscription request message. A communication protocol used to communicate with the distinguished power receiver is determined based on a protocol version. Although the power transmitter 100 communicates with the power receiver, it determines whether the power receiver is valid, by using the load value, which changes when the power receiver is located within the effective charging area.

In step 220, the power transmitter 100 compares a reference load value of the power transmitter 100 with a load change value obtained through the load detection in step 200. The reference load value of the power transmitter 100 is determined in such a manner as to reflect a reference load value from the power receiver in the reference load value of the power transmitter 100 in order to enable the detection a load value, which changes when the power receiver is located within the effective charging area.

For example, when A denotes a measured value in a case where no object is located within the effective charging area of the power transmitter 100, and B denotes a measured value changing according to a case where the power receiver is located within the effective charging area of the power transmitter 100, the quantification of a measured value that changes as described above, for example, a difference between A and B, or B, is defined as the reference load.

Specifically, when an initial reference load of the power transmitter 100 has a value of 500 mA, and when a reference load value from the power receiver, namely, an impedance value reported by the power receiver, is equal to 10Ω, a reference load value, for example, 300 mA, in the power transmitter 100 is determined in view of the impedance value with the initial reference load as a reference. When a new power receiver is additionally located within the effective charging area, a reference load value in the power transmitter 100 is calculated based on the initial reference load, the reference load value of the existing power receiver and a reference load value of the new power receiver.

Therefore, the reference load value compared with the load change value in step 220 is the reference load value in the power transmitter, in which the reference load value from the power receiver is reflected. When the power transmitter 100 transmits power to one or more power receivers, reference load values, namely, impedance values, from the power receivers are different from each other. Accordingly, a reference load value in the power transmitter 100, which is compared with the load change value, also changes.

A power transmitter 100 determines whether a difference between a load change value, which has been calculated from the result of comparing the reference load value with the load change value, and a reference change value is within a predetermined allowable range. The predetermined allowable range may be a range that is set with a reference change value as a reference. The predetermined allowable range may be implemented so as to determine whether the load change value falls within the predetermined allowable range.

When a result of the determination in step 225 shows that the difference between the load change value and the reference change value is out of the predetermined allowable range, the power transmitter 100 proceeds to step 215. In step 215, the power transmitter 100 determines that the power receiver, which has transmitted the network subscription request message, is a non-intended object of power reception, with which the power transmitter 100 may communicate but which is inappropriate for being wirelessly charged by the power transmitter 100. For example, the power transmitter 100 determines that the power receiver is a device that may not perform wireless charging determined by a manufacturer or rules. Accordingly, the power transmitter 100 proceeds to step 245, and stops the transmission of power to the charging object. As described above, according to an embodiment of the present invention, by comparing the reference load value with the load change value, the power transmitter 100 may detect the invalid materials that approach the effective charging area simultaneously with the valid power receiver.

When the result of the determination in step 225 shows that the difference between the load change value and the reference change value falls within the predetermined allowable range, the power transmitter 100 determines that the power receiver, which has transmitted the network subscription request message, is a valid power receiver. In step 230, it is determined whether the power receiver may subscribe to the network. Specifically, the power transmitter 100 determines whether the power receiver may subscribe to the network for wirelessly transmitting power to multiple objects. For example, when the power transmitter 100 determines that the number of power receivers, which the power transmitter 100 charges, has already reached the maximum number of charging objects, the power transmitter 100 may have difficulty in allowing the power receiver, which has transmitted the network subscription request message, to participate in the network any longer. Also, when a protocol version of the power receiver is higher than a protocol version of the network for wirelessly transmitting power to multiple objects, the power transmitter 100 may determine that the power receiver may not subscribe to the network for wirelessly transmitting power.

Therefore, when a result of the determination in step 230 shows that the power receiver may not subscribe to the network, the power transmitter 100 transmits a network subscription rejection message to the power receiver, which has transmitted the network subscription request message, in step 240. Then, in step 245, the power transmitter 100 stops the transmission of power to the relevant charging object, namely, the power receiver, which has transmitted the network subscription request message.

When the result of the determination in step 230 shows that the power receiver may subscribe to the network, the power transmitter 100 transmits a network subscription approval message in response to the network subscription request message, in step 235. The network subscription approval message includes an ID of a network to which the power receiver belongs, schedule information, etc. Allocation schedule information for the power receiver is time information configured so as to prevent charging time periods of power receivers from overlapping in a case where there are a plurality of power receivers. The power receiver that receives the network subscription approval message uses a network ID received from the power transmitter 100 to subsequently transmit a message to the power transmitter 100.

After the power transmitter 100 transmits the network subscription approval message in step 235, it proceeds to step 300 of FIG. 6, and determines whether a power transmission request message is received from the power receiver within a limited time period. When the power transmission request message is not received from the power receiver within the limited time period, the power transmitter 100 proceeds to step 245 of FIG. 5. In step 245, because the power receiver does not request charging, the power transmitter 100 does not perform or stops the transmission of power to the power receiver.

When the power transmission request message is received from the power receiver within the limited time period, the power transmitter 100 determines whether it is possible to transmit power to the power receiver, in step 305. The power transmission request message includes a reference voltage of the power receiver, a reference current thereof, and a reference efficiency value thereof. Accordingly, the power transmitter 100 calculates a power value required by the power receiver by using multiple pieces of information included in the power transmission request message. For example, when a maximum output power value in the power transmitter 100 is equal to 20 W, and the power receiver may be charged even with 10 W, namely, a power value required by the power receiver is equal to 10 W, there occurs a case where the sum of a measured power value and the power value required by the power receiver exceeds the maximum output power value, due to power that the power transmitter 100 already transmits to another power receiver. The power transmitter 100 determines that it is not possible to transmit power to the power receiver. In contrast, when the sum of the measured power value and the power value required by the power receiver is less than the maximum output power value, the power transmitter 100 determines that it is possible to transmit power to the power receiver.

When it is not possible to transmit power to the power receiver, the power transmitter 100 transmits a power transmission rejection message to the power receiver, in step 310. When it is possible to transmit power to the power receiver, the power transmitter 100 transmits a power transmission approval message to the power receiver, in step 315.

In step 320, the power transmitter 100 determines whether a power transmission state message is received from the power receiver within a limited time period. When the power transmission state message is not received from the power receiver within the limited time period, the power transmitter 100 proceeds to step 245 of FIG. 5, and stops the transmission of power to the power receiver. When the power transmission state message is received from the power receiver within the limited time period, the power transmitter 100 determines the effectiveness of transmission power, in step 325. Power transmission state information that the power receiver transmits includes measured values, which are obtained by measuring a voltage and a current received through a coil or an antenna of the power receiver, and the reference efficiency of the power receiver. The voltage value and current value are measured by the voltage measurement unit 26 of the power receiver 110, and each of the measured voltage value and the measured current value may have a certain numerical value range or may be expressed as a percentage.

Accordingly, the power transmitter 100 may collect the received power transmission state information, the power value transmitted by the power transmitter 100 itself, and the reference efficiency value included in the initial information of the power receiver, and thereby may detect leakage power and may determine the effectiveness of transmission power. For example, when a power value of the power transmitter 100 is equal to 10 W and a power value calculated by using the current value or the voltage value included in the power transmission state information provided by the power receiver is equal to 5 W, a power efficiency value which is calculated by using the power value of the power transmitter 100 and the power value in the power receiver, is equal to 50%. The power value of the power transmitter 100 is calculated by using the voltage value and the current value measured by the voltage/current measurement unit 16.

The power transmitter 100 compares the power efficiency value with the reference efficiency value provided by the power receiver, and thereby determines the effectiveness of transmission power. The term "reference efficiency" refers to the quantification of the ratio of power transmitted by the power transmitter 100 to power received by the power receiver when the power receiver receives sufficient power from the power transmitter 100 and is normally charged.

In step 330, the power transmitter 100 determines whether a result of comparing the power value obtained through measurement by the power transmitter 100 with the reference efficiency value of the power receiver falls within an allowable range of a power transmission value. When a result of the determination in step 330 shows that a value obtained by the comparison (for example, a leakage power value) is out of an allowable range (for example, 40 to 60%) of a power transmission value, the power transmitter 100 proceeds to step 215 of FIG. 5, and determines that the power receiver is a non-intended object of power reception which is invalid. Otherwise, the power transmitter 100 may determine that invalid materials other than an actual power receiver enters and causes power loss. The power transmitter 100 then proceeds to step 245, and stops the transmission of power to the power receiver.

When the result of the comparison falls within the allowable range of the power transmission value, the power transmitter 100 transmits power to the power receiver, in step 335.

When the power transmitter 100 starts to transmit power to the power receiver as described above, the power receiver transmits a power transmission state message including power transmission state information of the power receiver itself to the power transmitter 100, periodically or at intervals according to predetermined rules. Therefore, as long as it is determined that the power transmitter 100 fails to receive a power transmission completion message from the power receiver in step 340, it returns to step 320, and determines whether a power transmission state message is received from the power receiver. After step 320 to step 335 are repeatedly performed, when it is determined the power transmission completion message is received in step 340, the power transmitter 100 determines that the charging of the power receiver has been completed, and proceeds to step 245 of FIG. 5 and stops the transmission of power to the power receiver.

As described above, the system for wirelessly transmitting power, according to an embodiment of the present invention may be largely divided into a step of subscribing to a network, a step of determining whether power is to be transmitted, and a step of transmitting power. In each step, invalid materials may be detected.

First, in the step of subscribing to the network, the power transmitter 100 recognizes a load change value through load detection, and attempts communication or waits. When communication is not achieved for a predetermined time period, the power transmitter 100 senses that invalid materials exist.

Also, in the step of determining whether power is to be transmitted, in a state where the power receiver subscribes to the network and communication between the power transmitter 100 and the power receiver is achieved, the power receiver transmits a message including an ID of the power receiver, a protocol version thereof, a reference load value thereof, and a reference efficiency value thereof. Also, the power transmitter 100 compares the load change value as sensed above with the reference load value, and thereby senses invalid materials located together with the power receiver. Thereafter, in the step of transmitting power, when the power receiver transmits a message including the value of a voltage and that of a current, which are received through the coil or the antenna, periodically or according to predetermined rules, the power transmitter 100 which receives the message, first calculates a reference efficiency value obtained by considering the received reference efficiency value and power transmitted by the power transmitter 100 itself, and then senses invalid materials.

As described above, in an embodiment of the present invention, even when one or more charging objects are located within the effective charging area, a determination may be made as to whether a non-intended object of power reception exists. Accordingly, the present invention has an advantage in that power can be stably transmitted to power receivers corresponding to other charging objects, except for the non-intended object of power reception.

Hereinafter, an operation of the power receiver, which is matched to the operation of the power transmitter, as shown in FIG. 5 and FIG. 6, is described with reference to FIG. 7, according to an embodiment of the present invention.

Figure 7:
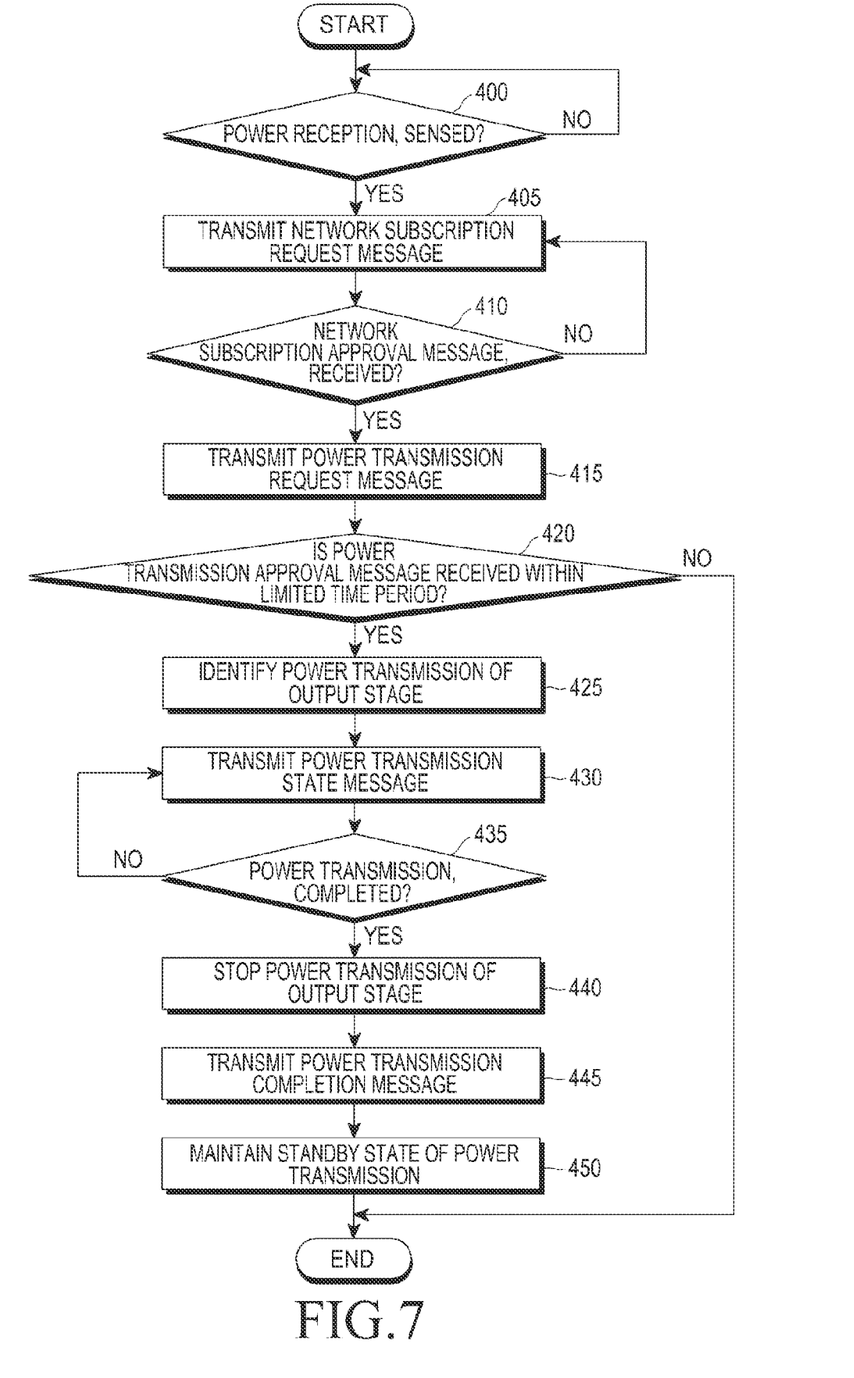
FIG. 7 is a flowchart illustrating an operation of a power receiver, according to an embodiment of the present invention.

Referring to FIG. 7, when it is determined that the power receiver 110 senses power reception in step 400, it transmits a request message for subscribing to a network for wirelessly transmitting power to multiple objects, in step 405. When it is determined that a network subscription approval message is received from the power transmitter 100 in response to the request message in step 410, the power receiver 110 transmits a power transmission request message to the power transmitter 100, in step 415. In contrast, when it is determined that the network subscription approval message is not received from the power transmitter 100 in response to the request message in step 410, the power receiver 110 returns to step 405, and may retransmit the network subscription request message, or may retransmit the network subscription request message by a predetermined number of times. When the power receiver 110 fails to receive the network subscription approval message although it retransmits the network subscription request message the predetermined number of times or more, the power receiver 110 may regard this case as subscription rejection, and may terminate the process.

After the power receiver 110 transmits the power transmission request message, it determines, in step 420, whether a power transmission approval message is received within a preset time period, namely, a limited time period. When the power transmission approval message is not received within the limited time period, the charging of the power receiver 110 is not allowed. Accordingly, the power receiver 110 terminates communication with the power transmitter 100. In contrast, when the power transmission approval message is received within the limited time period, the power receiver 110 identifies power transmission of an output stage, in step 425. Specifically, the power receiver 110 is charged in response to power that the power transmitter 100 starts to transmit, and measures a received current or voltage through the voltage measurement unit 26 of the power receiver 110 in response to this power transmission. Herein, the term "output stage" refers to a point between the regulator 21 and the constant voltage generator 20.

Accordingly, in step 430, the power receiver 110 transmits a power transmission state message including power transmission state information obtained through this measurement, to the power transmitter 100. Then, in step 435, the power receiver 110 determines whether the transmission of power from the power transmitter 100 is completed, namely, whether the charging is completed. When the transmission of power from the power transmitter 100 is completed, the power receiver 110 stops power transmission of the output stage in step 440. Specifically, the power receiver 110 stops the power transmission for charging a battery. Because the charging has been completed, the power receiver transmits a power transmission completion message in order to notify the power transmitter 100 of the completion of the charging, in step 445. In step 450, the power receiver maintains a standby state, in which it waits for the transmission of power from the power transmitter 100. The term "standby state" refers to a state in which the charging of the power receiver has been completed but the power receiver is not disconnected from the power transmitter 100.

As described above, after the power receiver transmits initial basic information, such as, for example, a reference voltage value of the power receiver and a reference efficiency value thereof, to the power transmitter 100 and the power transmitter 100 starts to transmit power to the power receiver, the power receiver transmits a measured voltage value and a measured current value to the power transmitter 100, and thereby enables the power transmitter 100 to wirelessly transmit power to the power receiver.

In wirelessly transmitting power, the transmission of power to the invalid materials may reduce the efficiency of the system, and may cause an accident due to failure and overheating of the system. Therefore, the method for detecting a non-object of power reception, according to embodiments of the present invention corresponds to a technology that may secure the safety of the system for wirelessly transmitting power. Particularly, because the power receiver notifies the power transmitter 100 of load characteristics of the power receiver itself, the power transmitter 100, according to an embodiment of the present invention, may compare a measured value with a received value, and thereby may accurately determine whether a non-object of power reception exists.

Moreover, consideration is given to a state in which power receivers of various types coexist and are charged in an environment for wirelessly transmitting power to multiple objects, to which the present invention is applied. Accordingly, when each power receiver periodically transmits power transmission state information of each power receiver, the power transmitter 100 may monitor a power transmission state of each power receiver, and may accurately monitor the magnitude and efficiency of power, which is being transmitted in the overall system.

In wirelessly transmitting power, the transmission of power to the invalid materials may reduce the efficiency of the system, and may cause an accident due to failure and overheating of the system. In this case, embodiments of the present invention are advantageous in that the invalid materials can be sensed, and thus, the safety of the system for wirelessly transmitting power can be secured.

The power receiver, according to embodiments of the present invention, notifies the power transmitter of its own load characteristics. Accordingly, embodiments of the present invention are advantageous in that the power transmitter can compare a measured value with a received value and thereby can accurately determine whether the invalid materials exist.

Also, even when the power receiver and the invalid materials are simultaneously disposed within the effective charging area, the power transmitter, according to embodiments of the present invention, can detect whether the invalid materials exist.

Also, consideration is given to a state where various types of receivers for wirelessly receiving power coexist and are charged in the environment for wirelessly transmitting power to multiple objects, according embodiments of to the present invention. Accordingly, the power transmitter can monitor a power transmission state of each power receiver, and can accurately monitor the magnitude and efficiency of power that is being transmitted in the overall system for wirelessly transmitting power.

While the present invention has been shown and described with reference to certain embodiments thereof, it will be understood by those skilled in the art that various changes in form and detail may be made therein without departing from the spirit and scope of the present invention as defined by the appended claims and equivalents thereof.

What is claimed is:

1. A method for providing power to a power receiver by a power transmitter, the method comprising the steps of:
    detecting a load change caused by displacement of the power receiver;
    applying power for eliciting a response of the power receiver, if the load change is detected;
    receiving, from the power receiver, request information including a power value required by the power receiver;
    transmitting power to the power receiver, if the power transmitter is able to supply the power value;
    receiving a power state report from the power receiver in response to the power transmission; and
    stopping the power transmission, if a leakage power value exceeds a threshold range, wherein the leakage power value is determined based on the power state report.

2. The method as claimed in claim 1, further comprising:
    determining whether the power value required by the power receiver is capable of being supplied, if the request information is received within the predetermined time period; and
    stopping the power transmission, if the power transmitter is not able to supply the power value.

3. The method as claimed in claim 2, wherein determining whether the power value required by the power receiver is capable of being supplied comprises determining whether a sum of a power value measured by the power transmitter and the power value required by the power receiver exceeds a maximum output power value of the power transmitter.

4. The method as claimed in claim 1, further comprising:
    determining whether the power receiver is capable of subscribing to a network, by using information included in the request information, if the request information is received within a predetermined time period; and
    stopping the power transmission, when the power receiver is not capable of subscribing to the network.

5. The method as claimed in claim 4, further comprising transmitting a network subscription approval message before the power is transmitted to the power receiver, if the power receiver is capable of subscribing to the network.

6. The method as claimed in claim 1, wherein the request information comprises at least one of:
    an identification (ID) of the power receiver that has transmitted the request information;
    a protocol version for communication; and
    a reference load value and a reference efficiency value of the power receiver.

7. The method as claimed in claim 1, wherein applying the power comprises:
    measuring a load value of the power transmitter;
    comparing the measured load value with a predetermined threshold; and
    transmitting the power to the receiver, when a result of the comparison shows that the load change is detected that has a value greater than or equal to the predetermined threshold.

8. The method as claimed in claim 1, further comprising continuing to transmit the power to the power receiver if the leakage power value does not exceed the threshold range.

9. The method as claimed in claim 1, wherein information included in the power state report includes a voltage value or a current value that the power receiver measures in response to the transmission of the power from the power transmitter.

10. A power transmitter for providing power, the power transmitter comprising:
    a communication unit for performing wireless communication;
    a power supply unit for supplying power so as to generate a resonance frequency signal determined by a controller;

a voltage/current measurement unit for detecting a voltage and a current of a signal generated by the power supply unit;

a resonance signal generator for transmitting the power delivered by the power supply unit to one or more power receivers; and the controller for detecting that the voltage/current measurement unit detects a load change caused by displacement of a power receiver, controlling the resonance signal generator to apply power for eliciting a response of the power receiver, if the voltage/current measurement unit detects the load change, receiving, from the power receiver, request information including a power value required by the power receiver, performing a control operation so as to transmit power to the power receiver, if the Dower transmitter is able to supply the power value, receiving a power state report from the power receiver in response to the power transmission, and performing a control operation so as to stop the power transmission to the power receiver, if a leakage power value exceeds a threshold range, wherein the leakage power value is determined based on the power state report.

11. The power transmitter as claimed in claim 10, wherein the controller determines whether the power value required by the power receiver is capable of being supplied if the request information is received within a predetermined time period, and performs a control operation so as to stop the power transmission if the power transmitter is not able to supply the power value.

12. The power transmitter as claimed in claim 11, wherein the controller determines whether a sum of a power value detected by the power transmitter and the power value required by the power receiver exceeds a maximum output power value of the power transmitter, and performs a control operation so as to stop the power transmission to the power receiver when the sum exceeds the maximum output power value.

13. The power transmitter as claimed in claim 10, wherein the request information comprises at least one of:

an identification (ID) of the power receiver that has transmitted the request information;

a protocol version for communication; and a reference load value and a reference efficiency value of the power receiver.

14. The power transmitter as claimed in claim 10, wherein the controller determines, by using information included in the request information, whether the power receiver is capable of subscribing to a network if the request information is received within a predetermined time period, and performs a control operation so as to stop the power transmission if the power receiver is not capable of subscribing to the network.

15. The power transmitter as claimed in claim 14, wherein the controller performs a control operation so as to transmit a network subscription approval message before the power is transmitted to the power receiver when the power receiver is capable of subscribing to the network.

16. The power transmitter as claimed in claim 10, wherein information included in the power state report includes a voltage value or a current value that the power receiver detects in response to the power transmission from the power transmitter.

17. The power transmitter as claimed in claim 16, wherein the controller determines whether a value calculated by adding a power value required by the power receiver, which is calculated by using information included in the power state report, to a power value transmitted by the power transmitter is less than a maximum output power value of the power transmitter, and determines that the power is capable of being transmitted when the calculated value is less than the maximum output power value of the power transmitter.

* * * * *